(12) United States Patent
Epaud et al.

(10) Patent No.: US 11,167,666 B2
(45) Date of Patent: Nov. 9, 2021

(54) VEHICLE SEAT FOLDABLE INTO A CONSOLE POSITION AND INTO FORWARD FOLDED POSITION

(71) Applicant: FAURECIA Sièges d'Automobile, Nanterre (FR)

(72) Inventors: David Epaud, Lardy (FR); Farouk Bouzid, Bretigny sur Orge (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 74 days.

(21) Appl. No.: 16/571,448

(22) Filed: Sep. 16, 2019

(65) Prior Publication Data

US 2020/0101872 A1    Apr. 2, 2020

(30) Foreign Application Priority Data

Oct. 2, 2018    (FR) ..................................... 18 59139

(51) Int. Cl.
*B60N 2/20*    (2006.01)
*B60N 2/22*    (2006.01)
*B60N 2/12*    (2006.01)

(52) U.S. Cl.
CPC .................. *B60N 2/20* (2013.01); *B60N 2/12* (2013.01); *B60N 2/22* (2013.01)

(58) Field of Classification Search
CPC .......... B60N 2/20; B60N 2/2213; B60N 2/22; B60N 2002/952; B60N 2/3011; B60N 2/0232; B60N 2/919; B60N 2002/024
See application file for complete search history.

(56) References Cited

U.S. PATENT DOCUMENTS

| | | | |
|---|---|---|---|
| 2,926,948 A | 3/1960 | Koplin | |
| 3,011,822 A | 12/1961 | May | |
| 2002/0089223 A1* | 7/2002 | Yu | B60N 2/2213 297/362.11 |
| 2006/0033373 A1 | 2/2006 | Kammerer | |
| 2007/0138847 A1* | 6/2007 | Gundall | B60N 2/206 297/216.1 |
| 2010/0084903 A1* | 4/2010 | Kammerer | B60N 2/0292 297/329 |
| 2013/0320736 A1 | 12/2013 | Teufel | |
| 2015/0061339 A1* | 3/2015 | Perrin | B60N 2/3065 297/378.1 |

FOREIGN PATENT DOCUMENTS

| | | | |
|---|---|---|---|
| DE | 102009007051 B3 * | 5/2010 | ........... B60N 2/3065 |
| DE | 102011018330 A1 | 10/2012 | |
| EP | 0949116 A1 | 10/1999 | |
| EP | 1625966 A2 | 2/2006 | |

* cited by examiner

*Primary Examiner* — Milton Nelson, Jr.
(74) *Attorney, Agent, or Firm* — Barnes & Thornburg LLP

(57) ABSTRACT

A vehicle seat comprising a base, a seating portion connected to the base by a front connecting rod, a backrest support lockable on the base, a backrest pivotally mounted on the backrest support by a hinge mechanism and connected to the seating portion by a pivot. The backrest support is connected to the base by two rear connecting rods configured so that the backrest is folded horizontally in a console position when the front connecting rod pivots forward after unlocking the backrest support while the hinge mechanism is not actuated.

20 Claims, 12 Drawing Sheets

VEHICLE SEAT FOLDABLE INTO A CONSOLE POSITION AND INTO FORWARD FOLDED POSITION

PRIORITY CLAIM

This application claims priority to French Application No. FR18 59139, filed Oct. 2, 2018, which is expressly incorporated by reference herein.

BACKGROUND

The present disclosure relates to a seat, and particularly to a vehicle seat. More particularly, the present disclosure relates to a vehicle seat which is reconfigurable.

SUMMARY

According to the present disclosure, a vehicle seat comprises a base, a seating portion, a backrest support fixed on the base by a locking device selectably lockable to lock the backrest support on the base and unlockable to release the backrest support, and a backrest pivotally mounted on the backrest support by a hinge mechanism adapted to adjust an angular position of the backrest.

In illustrative embodiments, the seating portion being carried by at least one front connecting rod pivotally connected to the base and to the seating portion, and said seating portion being pivotally mounted on the backrest, said forward connecting rod being movable between a raised position corresponding to a normal position of use of the seat and a forward-folded position.

In illustrative embodiments, the backrest support further being connected to the base by at least one first rear connecting rod and at least one second rear connecting rod, the first rear connecting rod being pivotally mounted on the base by a lower pivot and on the backrest support by an upper pivot, and the second rear connecting rod being pivotally mounted on the base by a lower pivot and on the backrest by an upper pivot, the lower pivot of the first rear connecting rod being located forward of the lower pivot of the second rear connecting rod, and the upper pivot of the first rear connecting rod being located at a higher level than the upper pivot of the second rear connecting rod when the backrest support is locked on the base.

In illustrative embodiments, the seating portion being arranged so that the backrest can be folded generally horizontally in a retracted position when the front connecting rod pivots in the forward-folded position during actuation of the hinge mechanism to adjust the angular position of the backrest and while the backrest support is locked on the base, and the first rear connecting rod and the second rear connecting rod being arranged so that the backrest is folded generally horizontally in a console position when the front connecting rod pivots in the forward-folded position after unlocking the locking device while the hinge mechanism is not actuated, the console position being located higher than the retracted position above the base.

In illustrative embodiments, the seat backrest can be folded to either the retracted position or the console position in a simple and ergonomic manner. In particular, it is sufficient to actuate a single mechanism (either the hinge mechanism or the locking device) to reach one of these two positions.

In illustrative embodiments, one or more of the following arrangements may also possibly be used, the upper pivot of the first rear connecting rod is arranged rearward of the upper pivot of the second rear connecting rod when the backrest support is locked on the base, and forward of the upper pivot of the second rear connecting rod when the backrest is folded in the console position (thus obtaining a particularly effective raising and forward-tilting movement of the backrest support and the backrest).

In illustrative embodiments, one or more of the following arrangements may also possibly be used, the first rear connecting rod has a substantially L-shaped general shape which comprises a first section and a second section, the first section of the first rear connecting rod being connected to the base by the lower pivot of the first rear connecting rod, the second section of the first rear connecting rod being connected to the backrest support by the upper pivot of the first rear connecting rod, the first section of the first rear connecting rod being arranged generally horizontally and the second section of the first rear connecting rod extending upwardly from the first section when the backrest support is locked on the base.

In illustrative embodiments, one or more of the following arrangements may also possibly be used, the seating portion comprises at least one curved connecting rod which has a substantially L-shaped general shape comprising a substantially horizontal first section and a second section extending upwardly from the first section, the first section of the curved connecting rod being connected to the front connecting rod, the second section of the curved connecting rod being connected to the backrest.

In illustrative embodiments, the seat has two sides and comprises, respectively on the two sides: two front connecting rods, two backrest supports, two first rear connecting rods respectively connected to the two backrest supports, two second rear connecting rods respectively connected to the two backrest supports, two curved connecting rods, the first sections of the two curved connecting rods defining a support portion on which a user can sit.

In illustrative embodiments, the hinge mechanism is movable between a locked position where said hinge mechanism locks the backrest relative to the backrest support and an unlocked position where said hinge mechanism allows a pivoting of the backrest on the backrest support; the locking device comprises at least one movable hook mounted on the backrest support and an anchor member integral with the base; the hinge mechanism and the locking device are controlled by a same actuating device which is part of the backrest.

In illustrative embodiments, the seat further comprises: a motorized adjustment device adapted to control a rotation of the front connecting rod, an electric control device which controls the locking device, the hinge mechanism, and the motorized adjustment device; the electric control device is configured to be normally in a locking mode where the locking device locks the backrest support on the base, the hinge mechanism is in the locked position and the motorized adjustment device is not actuated, and said electric control device can be actuated to: either place the hinge mechanism in the unlocked position and then operate the motorized adjustment device while leaving the backrest support locked on the base, or unlock the locking device in order to release the backrest support and then operate the motorized adjustment device while leaving the hinge mechanism in the locked position.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

Figure 2:
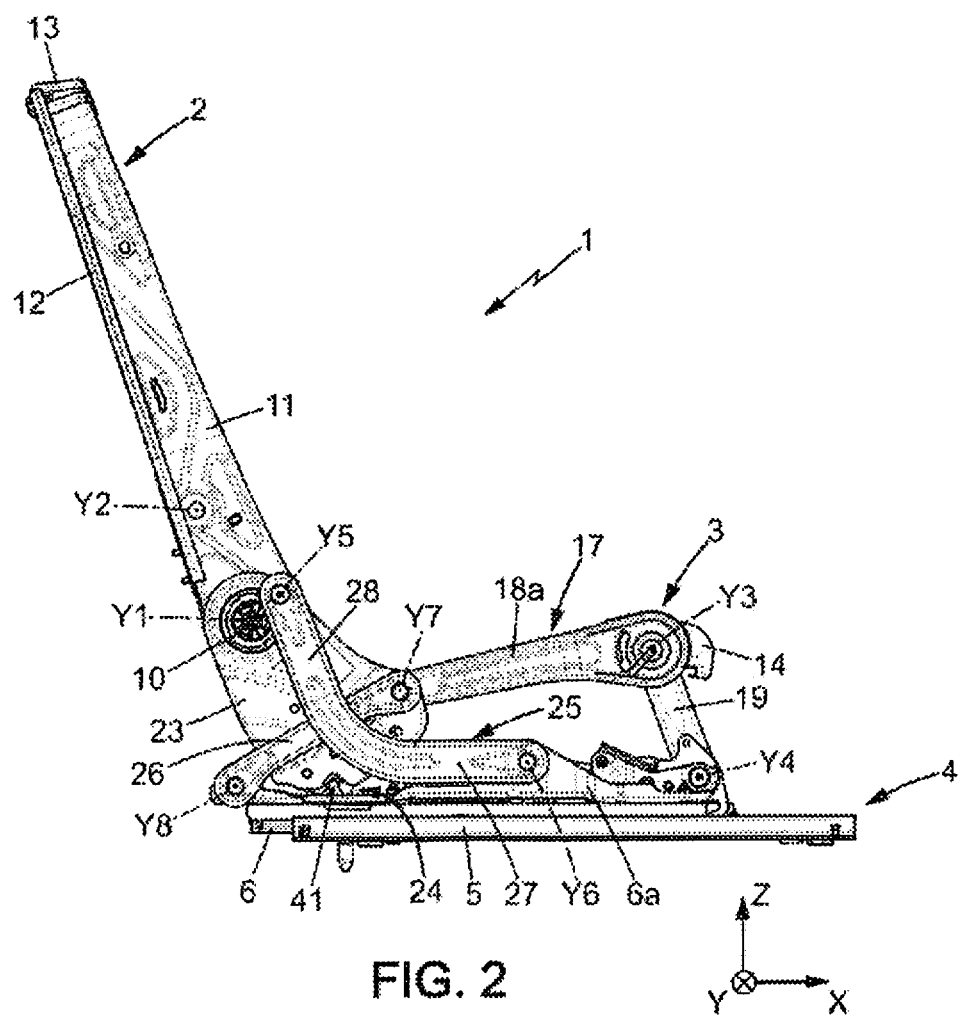
FIG. 2 is a side view of the frame of the seat of FIG. 1, in the normal position of use.
Figure 3:
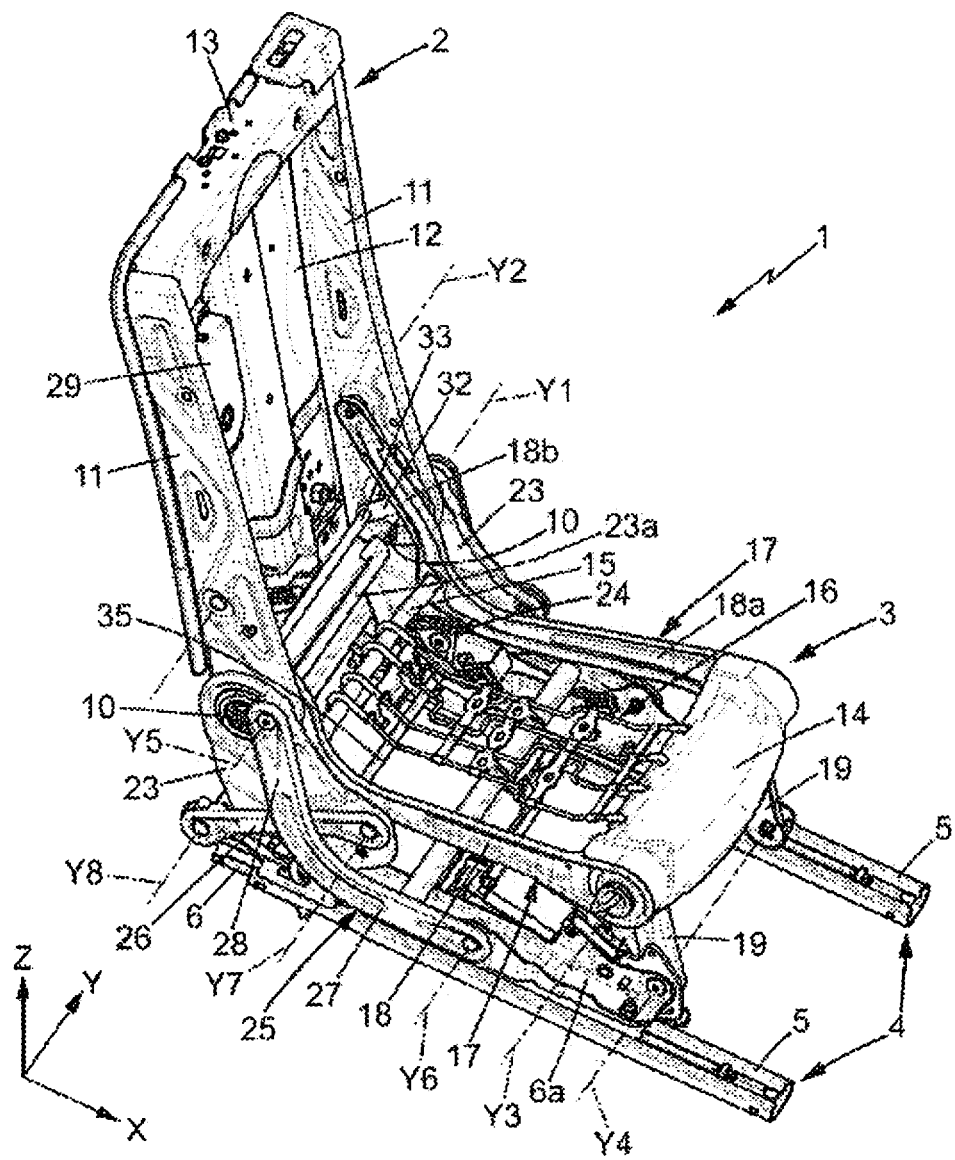
FIGS. 3 and 4 are perspective views of the seat frame of FIG. 2, viewed from each side of the seat.
Figure 10:
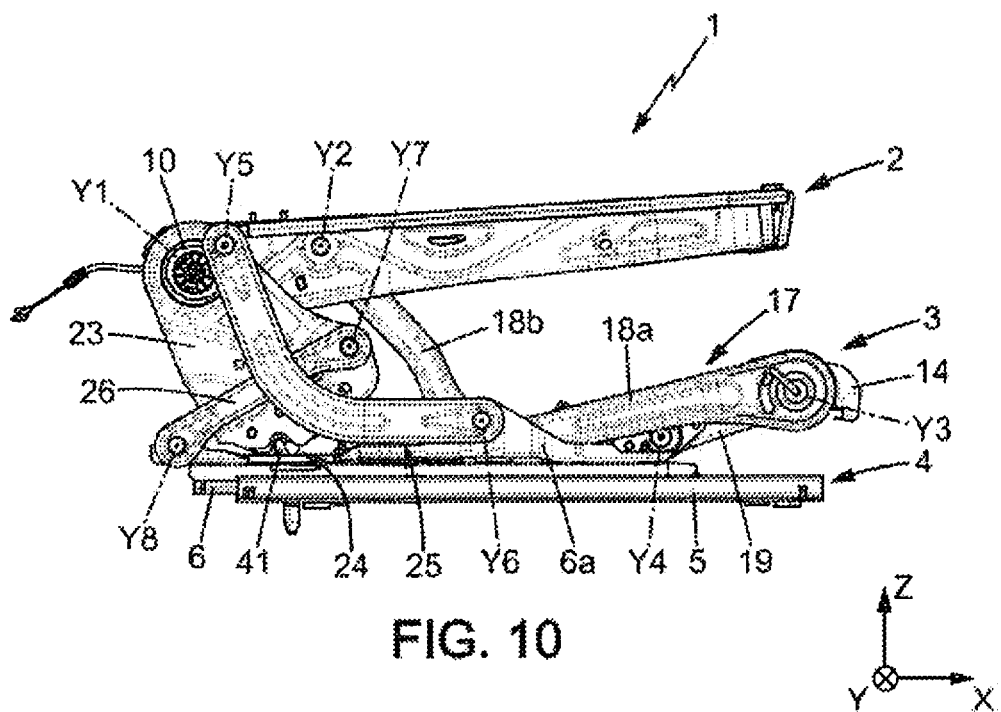
Figure 11:
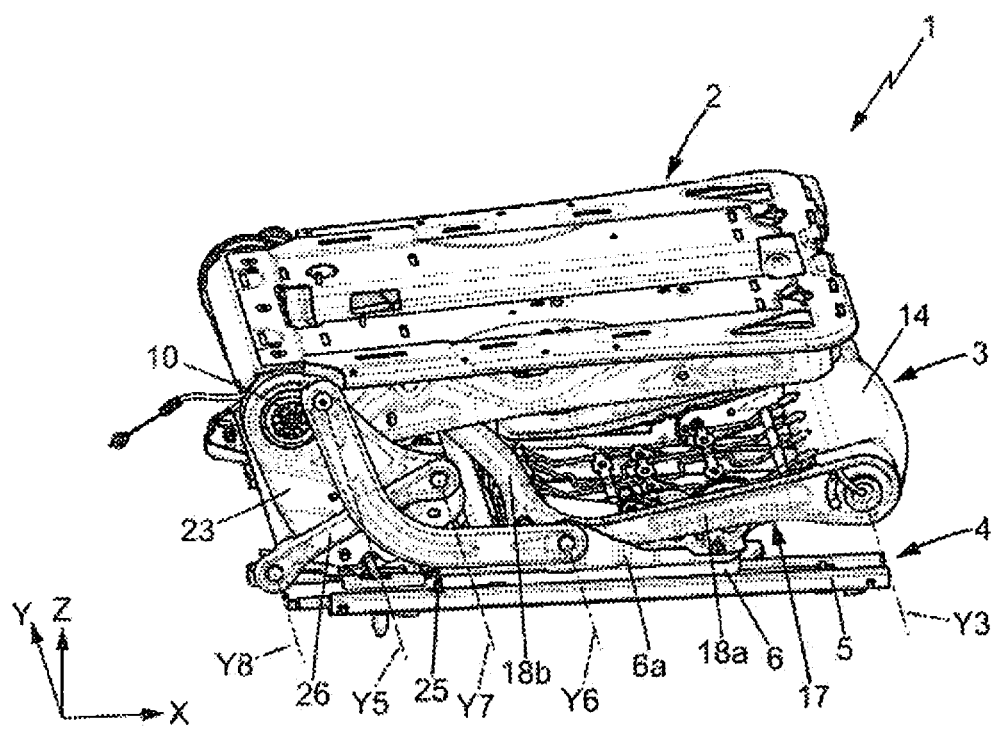
Figure 12:
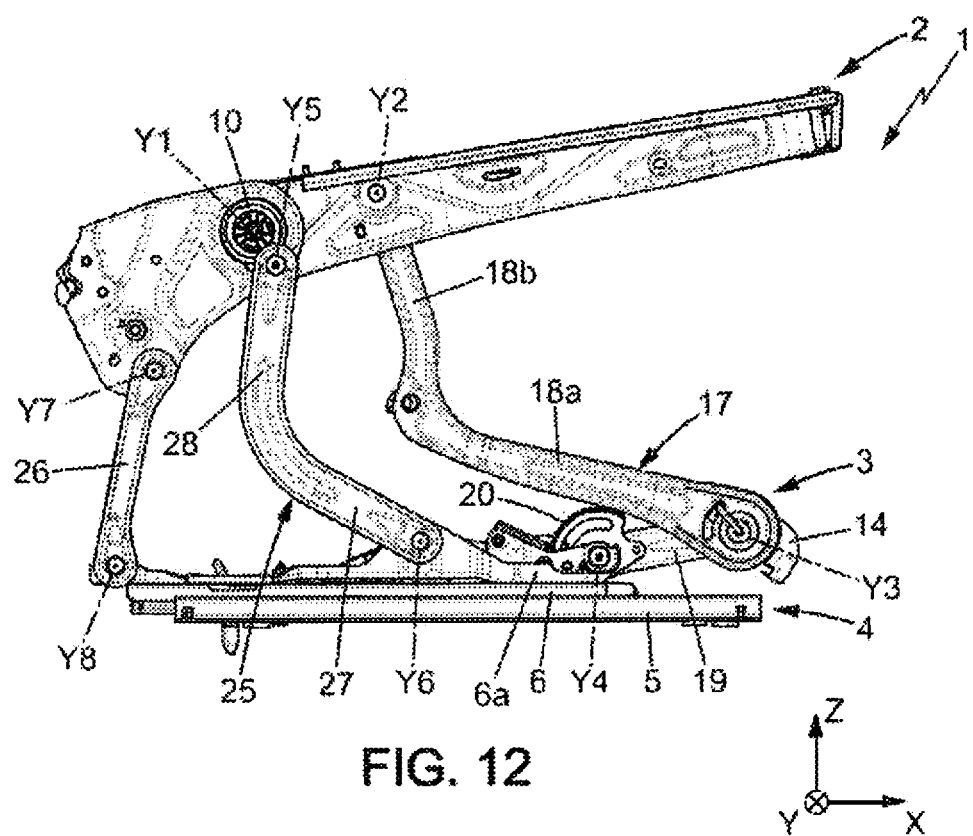
Figure 13:
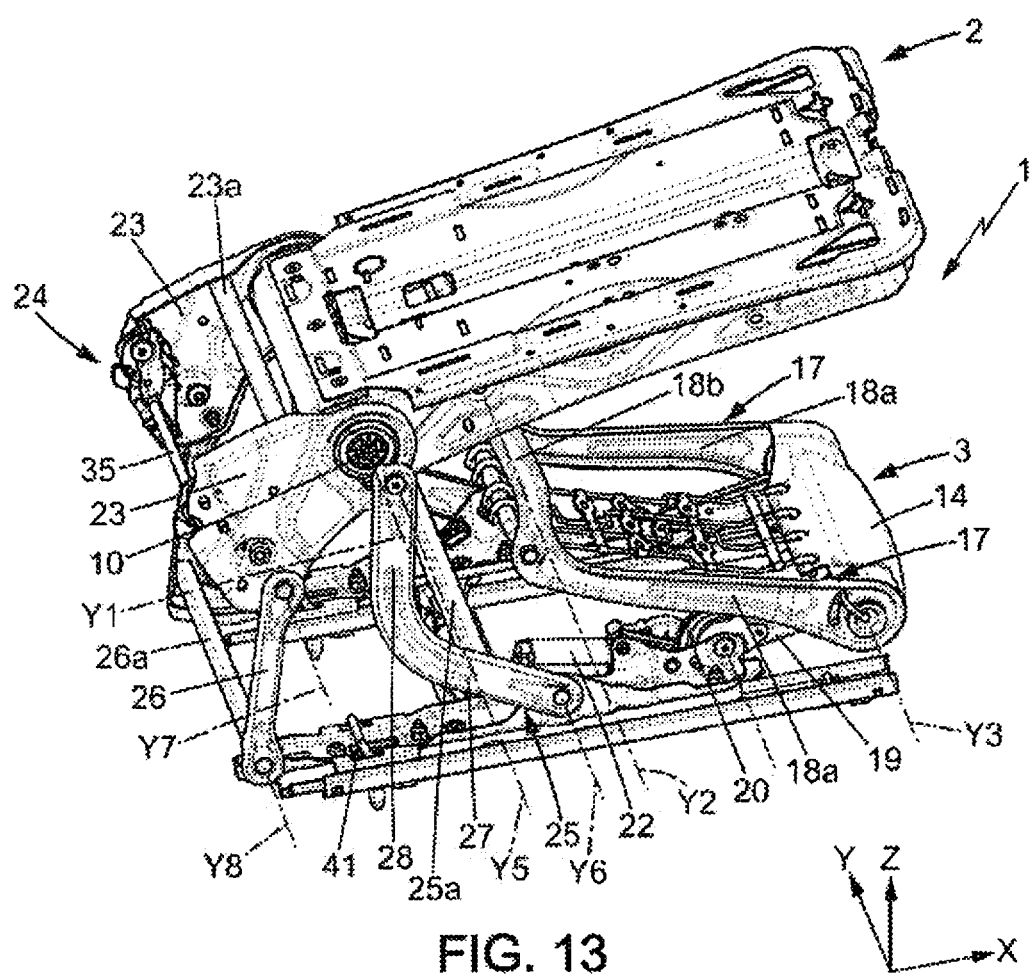

FIGS. 10 and 11 are views respectively similar to FIGS. 2 and 3, showing a retracted position of the backrest; and FIGS. 12 and 13 are views respectively similar to FIGS. 2 and 3, showing a console position of the backrest.

DETAILED DESCRIPTION

In the different figures, the same references designate identical or similar elements. In the following description, the spatial positioning indications such as top, bottom, upper, lower, horizontal, vertical, etc. are given for clarity of the description, based on the usual position of use of the rail and the seat, but are not limiting.

Figure 1:
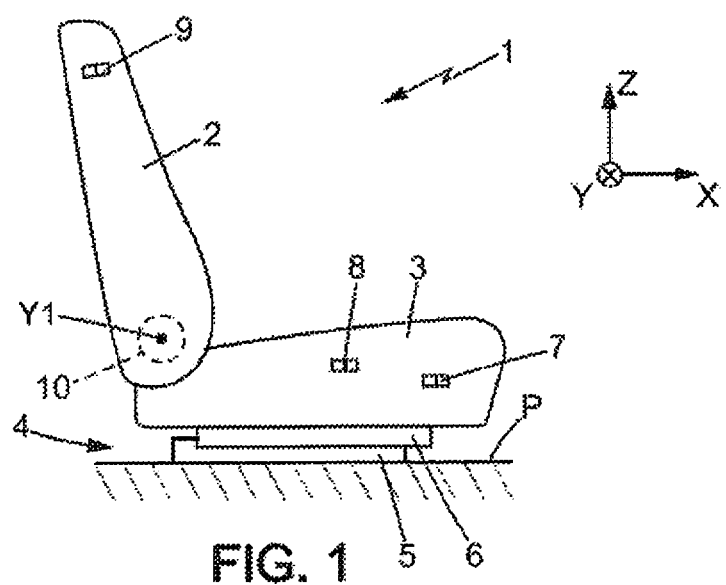
FIG. 1 is a schematic view of a seat according to one embodiment of the present description.

FIG. 1 shows a motor vehicle seat 1 which comprises a backrest 2 mounted on a seating portion 3. The seat in question may be for example a rear seat in the second or third row, but could also be a front seat.

The seating portion 3 is fixed on the floor P of the vehicle by means of rails 4 which allow the seat 1 to slide forwards and backwards on the floor P in a horizontal longitudinal direction X. Direction X may or may not be in alignment with the direction of advancement of the vehicle.

The rails are usually two in number and may each comprise a fixed profile 5 integral with the floor P and a movable profile 6 which slides on the fixed profile 5 and which carries the backrest 2 and the seating portion 3 of the seat. The movable profile can be locked in position on the fixed profile by a mechanical lock and/or by an electrical rail actuation device (known per se). In the particular case considered here, the rails 4 can be electrically controlled and can be actuated by a user of the seat by means of an actuating member 7 such as a two-way control button, but this arrangement is not mandatory in the context of the invention.

The movable profiles 6 of the two rails 4 together form a base carrying the backrest 2 and the seating portion 3. Alternatively, the seat could be without any rails 4 and the base could be constituted by a portion of the floor P of the vehicle.

The backrest 2 of the seat is provided with a hinge mechanism 10 which makes it possible to pivot the backrest 2 forwards and backwards, in particular about a transverse axis Y1 which is horizontal and perpendicular to the direction longitudinal X.

The movements of the backrest 2 may be electrically controlled by the user, for example by two actuating members 8, 9 such as bidirectional control buttons, as will be explained below. However, these arrangements are not mandatory, it being possible for the movements of the backrest 2 to be carried out manually without an electrical adjustment device.

Figure 4:
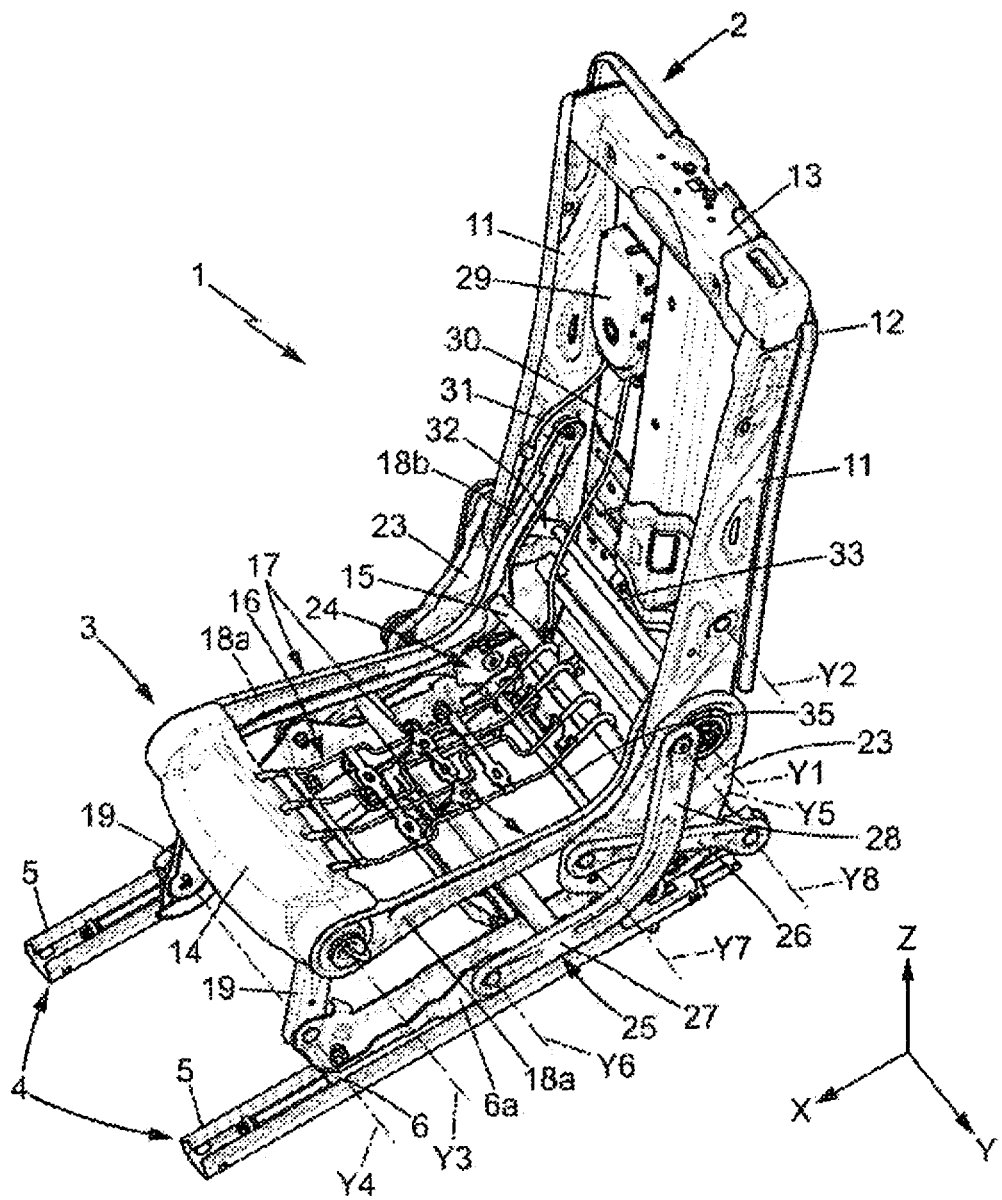

As represented in FIGS. 2 to 4, the frame of the backrest 2 may be made of metal or other resistant material and may possibly comprise in particular: two side flanges 11, a bed 12, an upper crossmember 13 connecting the upper ends of the side flanges 11.

The frame of the seating portion 3 may be made of metal or other resistant material and may possibly further comprise in particular a front crossmember 14 and a rear crossmember 15 between which is stretched a suspension layer 16 which supports the padding (not shown) of the seating portion.

The frame of the seating portion 3 may further comprise two parallel curved connecting rods 17 respectively arranged on the two sides of the seat. Each curved connecting rod 17 has a substantially L-shaped general shape comprising a first substantially horizontal section 18a towards the front and a second section 18b extending upwardly and rearwardly from the first section 18a, to a rear end which is mounted to pivot freely on the corresponding flange 11 of the backrest, about a transverse axis Y2 parallel to axis Y1 and arranged above axis Y1 in the normal position of use.

The first sections 18a of the two curved connecting rods 17 are connected together by the front 14 and rear 15 crossmembers, and define a support portion on which a user can sit.

The front ends of the first sections 18a of the two curved connecting rods 17 are mounted on the upper ends of two parallel front connecting rods 19 so as to pivot about a transverse axis of rotation Y3 parallel to axis Y1. The lower ends of the front connecting rods 19 are mounted on the movable profiles 6 of the rails, in particular on the rigid supports 6a fixed to said movable profiles 6, so as to pivot about a transverse axis of rotation Y4 parallel to axis Y1. Each front connecting rod 19 is movable between a raised position corresponding to a normal position of use of the seat (FIGS. 2-4) and a forward-folded position.

Figure 5:
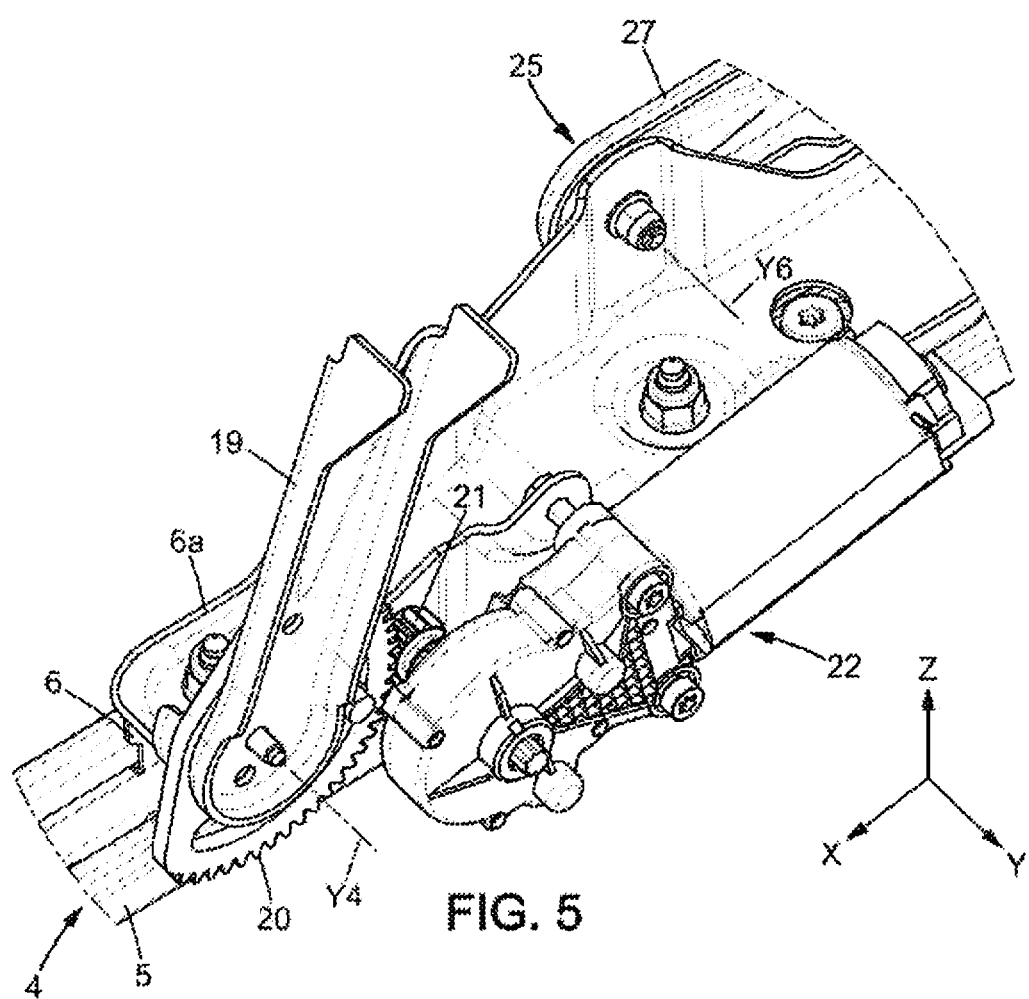
FIG. 5 is a detailed perspective view showing a motorized adjustment device that can equip one of the front connecting rods of the seat.

As represented in FIG. 5, the lower end of one of the front connecting rods 19 (or where appropriate of the two front connecting rods 19) may be provided with a toothed sector 20 centered on axis Y4, which meshes with a pinion 21 controlled by an electric gearmotor 22 fixed to the support 6a. In the case where the seat is not electrically controlled, these arrangements can be omitted.

The seat 1 further comprises, respectively on the two sides of the seat, two rigid backrest supports 23, for example of metal, which may for example each extend in a plane XZ where Z is a vertical axis. The two backrest supports may possibly be interconnected by at least one rigid crosspiece 23a (FIGS. 3 and 13).

The backrest 2 is pivotally mounted on the backrest supports 23 by said hinge mechanism 10, where appropriate by two hinge mechanisms 10 arranged on the two sides of the seat and controlled in synchronism, as in the example shown. The or each hinge mechanism 10 may be for example a cam and cam follower hinge mechanism, movable between a locked position where said hinge mechanism 10 immobilizes the backrest 2 relative to the backrest supports 23 and an unlocked position where the backrest 2 can pivot relative to the backrest supports 23 about axis Y1. Reference is hereby made to French Application No. FR292888A1 for disclosure relating to a hinge mechanism, which application is hereby incorporated in its entirety herein.

Each backrest support 23 is fixed on the corresponding support 6a by a locking device 24 that is selectively lockable to lock the backrest support 23 on the support 6a and unlockable to release the backrest support 23. It is possible for a single locking device 24 to be provided on only one side of the seat.

Each backrest support 23 is further connected to the corresponding support 6a by a first rear connecting rod 25 and a second rear connecting rod 26.

The first rear connecting rod 25 is mounted on the support 6a by a lower pivot so as to pivot about a transverse axis of rotation Y6 and on the corresponding backrest support 23 by an upper pivot so as to pivot about a transverse axis of rotation Y5. The first two rear connecting rods 25 may be interconnected by a rigid crosspiece 25a (FIG. 13).

The second rear connecting rod 26 is mounted on the support 6a by a lower pivot so as to pivot about a transverse axis of rotation Y8 and on the backrest support 23 by an upper pivot so as to pivot about a transverse axis of rotation Y7. The two second rear connecting rods 26 may be interconnected by a rigid crosspiece 26a (FIG. 13).

The axes of rotation Y5-Y8 are parallel to axis Y1 and the pivots will be designated hereinafter by the designation of the axes of rotation Y5-Y8.

The lower pivot Y6 of the first rear connecting rod 25 is located forward of the lower pivot Y8 of the second rear connecting rod 26, and the upper pivot Y5 of the first rear connecting rod 25 is located at a higher level than the upper pivot Y7 of the second rear connecting rod 26 when the backrest support is locked on the support 6a.

The upper pivot Y5 of the first rear connecting rod 25 may further be arranged rearward of the upper pivot Y7 of the second rear connecting rod 26 when the backrest support 23 is locked on the support 6a.

The first rear connecting rod 25 may have a substantially L-shaped general shape which comprises a first section 27 and a second section 28, the first section 27 of the first rear connecting rod 25 being connected to the support 6a by the lower pivot Y6 of the first rear connecting rod 25, the second section 28 of the first rear connecting rod 25 being connected to the backrest support 23 by the upper pivot Y5 of the first rear connecting rod, the first section 27 of the first rear connecting rod 25 being arranged substantially horizontally and the second section 28 of the first rear connecting rod 25 extending upwardly from the first section 27 when the backrest support 23 is locked on the support 23. Alternatively, the first rear connecting rod 25 may have a generally straight shape.

The backrest 2 may further comprise an actuating device 29 controlling the hinge mechanisms 10 and the locking devices 24. This actuating device 29 may for example be fixed to the bed 12 of the backrest 2. The actuating device 29 may control two cables 30, 31 which respectively actuate the hinge mechanisms 10 and the locking devices 24. Reference is hereby made to French Patent Application No. FR1855919, filed Jun. 28, 2018, for disclosure related to a pulley device, which application is hereby incorporated in its entirety herein. The actuating device 29 may comprise an electric actuator of any known type (motor or other), or may be manually controlled if the seat is not electrically controlled.

Figure 6:
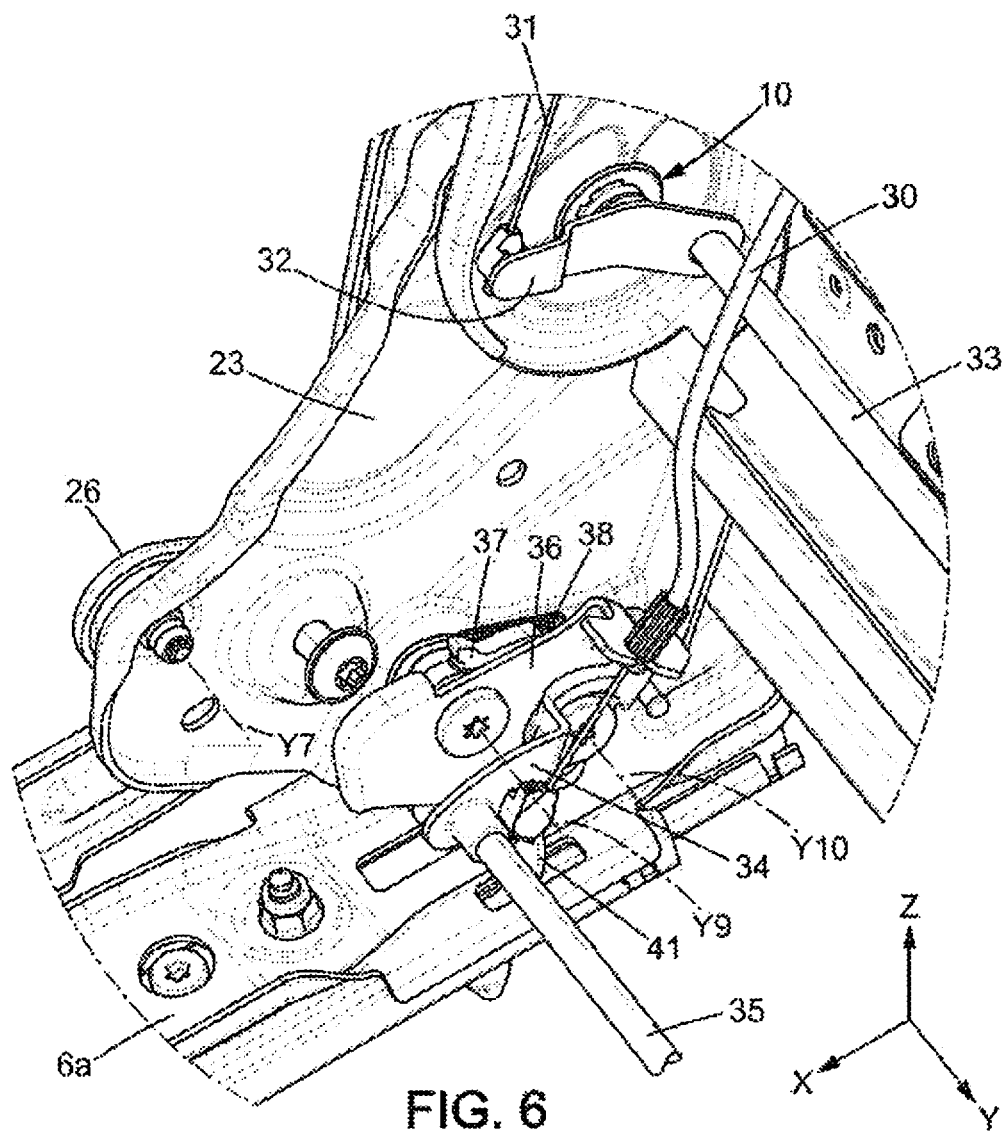
FIG. 6 is a detailed perspective view showing a locking device adapted for selectively locking the backrest support of the seat on a base of the seat.

As represented in FIG. 6, cable 31 may, for example, be connected to a control lever 32 controlling one of the hinge mechanisms 10, connected by an interconnecting bar 33 to a similar control lever 32 controlling the other hinge mechanism 10 when such is provided.

Figure 7:
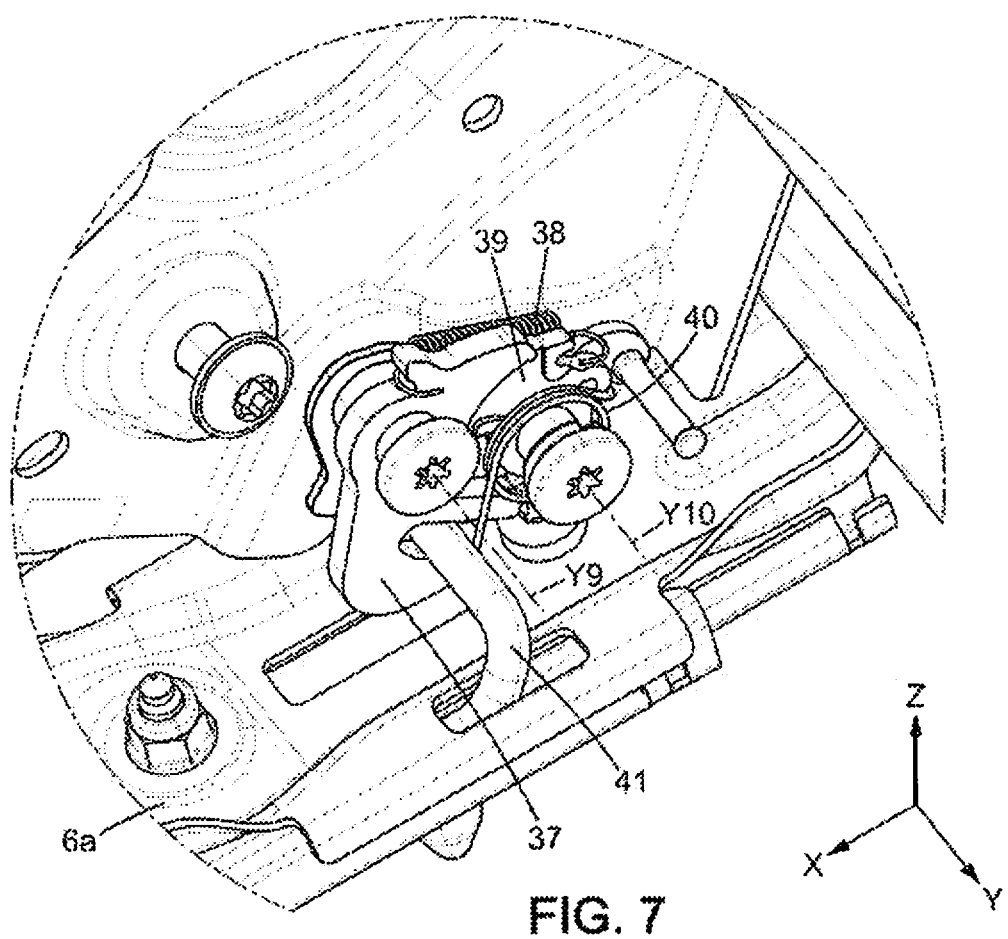
FIG. 7 is a view similar to FIG. 6, where certain parts have been removed to better show the locking device.

As represented in FIGS. 6 and 7, cable 30 may be connected to a control lever 34 of one of the locking devices 24, connected by an interconnecting bar 35 to a similar control lever 34 controlling the other locking device 24 when such is provided. The control lever 34 may for example be integral with a locking cam 39 mounted on a plate 36 integral with the backrest support 23, so as to pivot about a transverse axis of rotation Y9 parallel to axis Y1. The locking cam 39 can control a locking hook 37 which is mounted on the plate about a transverse axis of rotation Y9 parallel to axis Y1. The locking hook 37 is adapted to hook on an anchor member 41 integral with the support 6a, for example a rigid metal rod welded to the support 6a. The locking hook 37 may be biased by a spring 38 to an unlocking position where said locking hook 37 does not interfere with the anchor member 41, and it can be displaced by the locking cam 39, under the effect of a cam spring 40 stronger than spring 38, into a locking position (visible in FIG. 7) where said locking hook 37 catches on the anchor member 41, thus locking the backrest support 23 to the support 6a. One will note that the locking device 24 could be of any other known type.

When the seat is electrically controlled, it may comprise an electric control device 11, for example a microcontroller or where appropriate a dedicated electrical circuit, which is configured to control the locking devices 24, the hinge mechanisms 10, and the motorized adjustment device 22 of the front connecting rods 19. More precisely, in the case described here, the electric control device 11 can control the actuating device 29 and the motorized adjustment device 22 of the front connecting rods 19, as well as the electric adjustment of the rails 4 where appropriate.

Figure 8:
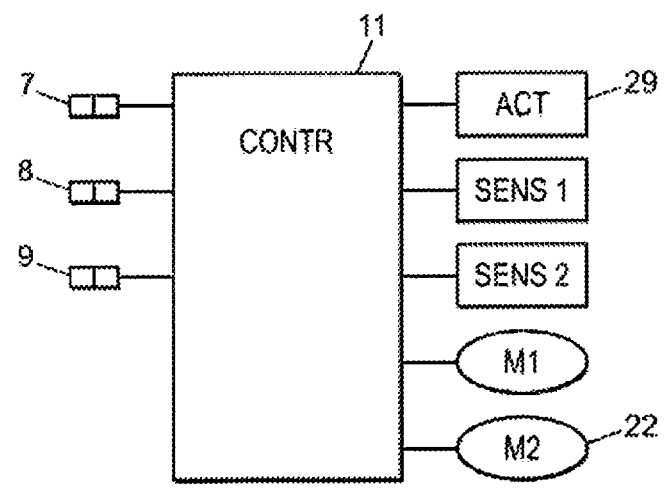
FIG. 8 is a block diagram showing a control device for the seat.

As represented in FIG. 8, the electric control device 11 (CONTR) can be controlled by the above-mentioned actuators 7, 8, 9 and is connected to the actuating device 29 (ACT), to the electric motor M1 for adjusting the rails 4, to the motorized adjustment device 22 (M2) of the front connecting rods 19, as well as to sensors SENS1, SENS2 (particularly position sensors) respectively indicating the unlocked state of the hinge mechanisms 10 and locking devices 24.

The electric control device 11 is configured to operate normally in a locking mode where the locking devices 24 lock the backrest supports 23 on the supports 6a, the hinge mechanisms 10 are in the locked position, and the motorized adjustment device 22 is not actuated.

Upon actuation of actuating member 7, the electric control device 11 is adapted to control an adjustment of the rails 4.

Figure 9:
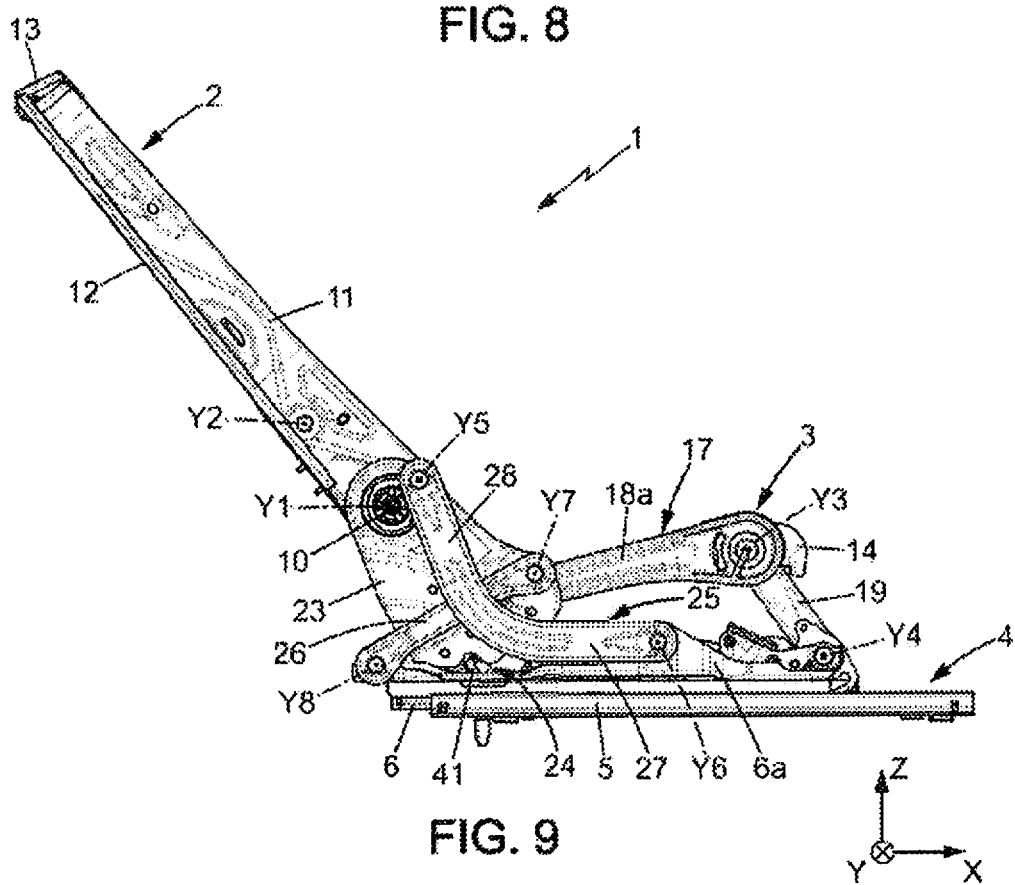
FIG. 9 is a view similar to FIG. 2, showing a comfort-adjustment position of the backrest.

Upon actuation of actuating member 8, the electric control device 11 is adapted to control the actuating device 29 to place the hinge mechanisms 10 in the unlocked position and then operate the motorized adjustment device 22 while leaving the backrest supports 23 locked on the supports 6a. The user can thus adjust the forward and backward tilt angle of the backrest 2 for comfort (including placing the backrest 2 in the relaxation position that is tilted far rearward, as represented in FIG. 9, or the user can rotate the backrest to a generally horizontal retracted position such as the one shown in FIGS. 10 and 11. In this retracted position, the front connecting rods 19 are in the forward-folded position and the rear face of the backrest 2 may for example be in the extension of the floor P, or at least the portion of the floor P located behind the seat 1 (particularly if it is a second or third row seat). Actuation of the actuating member 8 in the opposite direction then returns to the normal position of use.

Upon actuation of actuating member 9, the electric control device 11 is adapted to control the actuating device 29 to unlock the locking devices 24 in order to release the backrest support 23, and then to operate the motorized adjustment device 22 while leaving the hinge mechanisms 10 in the locked position. The user can thus fold the backrest 2 forward generally horizontally, starting from the normal position of use of the seat, to place the backrest 2 in a console position that is higher than the retracted position. This console position may make it possible to use the rear face of the backrest 2 as an armrest for at least one neighboring seat. During this movement, the front connecting rods 19 pivot to the forward-folded position and the rear connecting rods 25, 26 unfold, the upper pivot Y5 of the first rear connecting rod 25 then being located forward of the upper pivot Y7 of the second rear connecting rod 26. Actuation of the actuating member 9 in the opposite direction then returns to the normal position of use.

Reference is hereby made to European Application No. 0949116A1 for disclosure relating to a folding backrest of a seat, which application is hereby incorporated in its entirety herein.

The invention claimed is:

1. A vehicle seat comprising:
  a base,
  a seating portion,
  a backrest support fixed on the base by a locking device selectively lockable to lock the backrest support on the base and unlockable to release the backrest support,
  a backrest pivotally mounted on the backrest support by a hinge mechanism adapted to adjust an angular position of the backrest,
  the seating portion being carried by at least one front connecting rod pivotally connected to the base and to the seating portion, and said seating portion being pivotally mounted on the backrest,
  said front connecting rod being movable between a raised position corresponding to a normal position of use of the seat and a forward-folded position,
  the backrest support further being connected to the base by at least one first rear connecting rod and at least one second rear connecting rod, the first rear connecting rod being pivotally mounted on the base by a lower pivot and on the backrest support by an upper pivot, and the second rear connecting rod being pivotally mounted on the base by a lower pivot and on the backrest support by an upper pivot,
  the lower pivot of the first rear connecting rod being located forward of the lower pivot of the second rear connecting rod, and the upper pivot of the first rear connecting rod being located at a higher level than the upper pivot of the second rear connecting rod when the backrest support is locked on the base,
  the seating portion being arranged so that the backrest is folded generally horizontally relative to the base in a retracted position when the front connecting rod is in the forward-folded position and during actuation of the hinge mechanism to adjust the angular position of the backrest and while the backrest support is locked on the base, and
  the first rear connecting rod and the second rear connecting rod being arranged so that the backrest is folded generally horizontally relative to the base in a console position when the front connecting rod is in the forward-folded position after unlocking the locking device and while the hinge mechanism is not actuated, the console position being located higher than the retracted position above the base,
  wherein the upper pivot of the first rear connecting rod is arranged rearward of the upper pivot of the second rear connecting rod when the backrest support is locked on the base, and forward of the upper pivot of the second rear connecting rod when the backrest is folded in the console position.

2. The vehicle seat of claim 1, wherein the hinge mechanism and the locking device are controlled by a same actuating device which is part of the backrest.

3. The vehicle seat of claim 1, wherein the first rear connecting rod has a substantially L-shaped general shape which comprises a first section and a second section, the first section of the first rear connecting rod being connected to the base by the lower pivot of the first rear connecting rod, the second section of the first rear connecting rod being connected to the backrest support by the upper pivot of the first rear connecting rod, the first section of the first rear connecting rod being arranged substantially horizontally and the second section of the first rear connecting rod extending upwardly from the first section when the backrest support is locked on the base.

4. The vehicle seat of claim 1, wherein the seating portion comprises at least one curved connecting rod which has a substantially L-shaped general shape comprising a substantially horizontal first section and a second section extending upwardly from the first section, the first section of the curved connecting rod being connected to the front connecting rod, the second section of the curved connecting rod being connected to the backrest.

5. The vehicle seat of claim 4, wherein the seat has two sides and comprises, respectively on the two sides: two front connecting rods, two backrest supports, two first rear connecting rods respectively connected to the two backrest supports, two second rear connecting rods respectively connected to the two backrest supports, two curved connecting rods, the first sections of the two curved connecting rods defining a support portion on which a user can sit.

6. The vehicle seat of claim 1, wherein the hinge mechanism is movable between a locked position where said hinge mechanism locks the backrest relative to the backrest support and an unlocked position where said hinge mechanism allows a pivoting of the backrest on the backrest support.

7. The vehicle seat of claim 1, wherein the locking device comprises at least one movable hook mounted on the backrest support and an anchor member integral with the base.

8. The vehicle seat of claim 1, wherein the backrest provides an armrest in the console position.

9. A vehicle seat comprising:
  a base,
  a seating portion,
  a backrest support fixed on the base by a locking device selectively lockable to lock the backrest support on the base and unlockable to release the backrest support,
  a backrest pivotally mounted on the backrest support by a hinge mechanism adapted to adjust an angular position of the backrest,
  the seating portion being carried by at least one front connecting rod pivotally connected to the base and to the seating portion, and said seating portion being pivotally mounted on the backrest, said front connecting rod being movable between a raised position corresponding to a normal position of use of the seat and a forward-folded position, the backrest support further being connected to the base by at least one first rear connecting rod and at least one second rear connecting rod, the first rear connecting rod being pivotally mounted on the base by a lower pivot and on the backrest support by an upper pivot, and the second rear connecting rod being pivotally mounted on the base by a lower pivot and on the backrest support by an upper pivot, the lower pivot of the first rear connecting rod being located forward of the lower pivot of the second rear connecting rod, and the upper pivot of the first rear connecting rod being located at a higher level than the upper pivot of the second rear connecting rod when the backrest support is locked on the base, the seating portion being arranged so that the backrest is folded generally horizontally relative to the base in a retracted position when the front connecting rod is in the forward-folded position and during actuation of the hinge mechanism to adjust the angular position of the backrest and while the backrest support is locked on the base, the first rear connecting rod and the second rear connecting rod being arranged so that the backrest is folded generally horizontally relative to the base in a console position when the front connecting rod is in the forward-folded position after unlocking the locking device and while the hinge mechanism is not actuated, the console position being located higher than the retracted position above the base, and wherein the hinge mechanism is movable between a locked position where said hinge mechanism locks the backrest relative to the backrest support and an unlocked position where said hinge mechanism allows a pivoting of the backrest on the backrest support, and wherein the hinge mechanism and the locking device are controlled by a same actuating device which is part of the backrest.

10. The vehicle seat of claim 9, further comprising: a motorized adjustment device adapted to control a rotation of the front connecting rod, an electric control device which controls the locking device, the hinge mechanism, and the motorized adjustment device.

11. The vehicle seat of claim 9, wherein the vehicle seat has a first height in the normal position of use, a second height in the retracted position, and a third height in the console position, the first height being greater than the second height and the third height, and the third height being greater than the second height.

12. The vehicle seat of claim 9, wherein the seating portion comprises at least one curved connecting rod which has a substantially L-shaped general shape comprising a substantially horizontal first section and a second section extending upwardly from the first section, the first section of the curved connecting rod being connected to the front connecting rod, the second section of the curved connecting rod being connected to the backrest.

13. The vehicle seat of claim 12, wherein the seat has two sides and comprises, respectively on the two sides: two front connecting rods, two backrest supports, two first rear connecting rods respectively connected to the two backrest supports, two second rear connecting rods respectively connected to the two backrest supports, two curved connecting rods, the first sections of the two curved connecting rods defining a support portion on which a user can sit.

14. The vehicle seat of claim 9, wherein the hinge mechanism is movable between a locked position where said hinge mechanism locks the backrest relative to the backrest support and an unlocked position where said hinge mechanism allows a pivoting of the backrest on the backrest support.

15. A vehicle seat comprising:
a base,
a seating portion,
a backrest support fixed on the base by a locking device selectively lockable to lock the backrest support on the base and unlockable to release the backrest support,
a backrest pivotally mounted on the backrest support by a hinge mechanism adapted to adjust an angular position of the backrest,
the seating portion being carried by at least one front connecting rod pivotally connected to the base and to the seating portion, and said seating portion being pivotally mounted on the backrest,
said front connecting rod being movable between a raised position corresponding to a normal position of use of the seat and a forward-folded position,
the backrest support further being connected to the base by at least one first rear connecting rod and at least one second rear connecting rod, the first rear connecting rod being pivotally mounted on the base by a lower pivot and on the backrest support by an upper pivot, and the second rear connecting rod being pivotally mounted on the base by a lower pivot and on the backrest support by an upper pivot,
the lower pivot of the first rear connecting rod being located forward of the lower pivot of the second rear connecting rod, and the upper pivot of the first rear connecting rod being located at a higher level than the upper pivot of the second rear connecting rod when the backrest support is locked on the base,
the seating portion being arranged so that the backrest is folded generally horizontally relative to the base in a retracted position when the front connecting rod is in the forward-folded position and during actuation of the hinge mechanism to adjust the angular position of the backrest and while the backrest support is locked on the base, and
the first rear connecting rod and the second rear connecting rod being arranged so that the backrest is folded generally horizontally relative to the base in a console position when the front connecting rod is in the forward-folded position after unlocking the locking device and while the hinge mechanism is not actuated, the console position being located higher than the retracted position above the base,
wherein the locking device comprises at least one movable hook mounted on the backrest support and an anchor member integral with the base, and
wherein the hinge mechanism and the locking device are controlled by a same actuating device which is part of the backrest.

16. The vehicle seat of claim 15, further comprising: a motorized adjustment device adapted to control a rotation of the front connecting rod, an electric control device which controls the locking device, the hinge mechanism, and the motorized adjustment device.

17. The vehicle seat of claim 16, wherein the electric control device is configured to be normally in a locking mode where the locking device locks the backrest support on the base, the hinge mechanism is in the locked position and the motorized adjustment device is not actuated, and said electric control device can be actuated to: either place the hinge mechanism in the unlocked position and then operate the motorized adjustment device while leaving the backrest support locked on the base, or unlock the locking device in order to release the backrest support and then operate the motorized adjustment device while leaving the hinge mechanism in the locked position.

18. A vehicle seat comprising:
a base,
a seating portion,
a backrest support fixed on the base by a locking device selectively lockable to lock the backrest support on the base and unlockable to release the backrest support,
a backrest pivotally mounted on the backrest support by a hinge mechanism adapted to adjust an angular position of the backrest,
the seating portion being carried by at least one front connecting rod pivotally connected to the base and to the seating portion, and said seating portion being pivotally mounted on the backrest,
said front connecting rod being movable between a raised position corresponding to a normal position of use of the seat and a forward-folded position,
the backrest support further being connected to the base by at least one first rear connecting rod and at least one second rear connecting rod, the first rear connecting rod being pivotally mounted on the base by a lower pivot and on the backrest support by an upper pivot, and the second rear connecting rod being pivotally mounted on the base by a lower pivot and on the backrest support by an upper pivot,
the lower pivot of the first rear connecting rod being located forward of the lower pivot of the second rear connecting rod, and the upper pivot of the first rear connecting rod being located at a higher level than the upper pivot of the second rear connecting rod when the backrest support is locked on the base,
the seating portion being arranged so that the backrest is folded generally horizontally relative to the base in a retracted position when the front connecting rod is in the forward-folded position and during actuation of the hinge mechanism to adjust the angular position of the backrest and while the backrest support is locked on the base, and
the first rear connecting rod and the second rear connecting rod being arranged so that the backrest is folded generally horizontally relative to the base in a console position when the front connecting rod is in the forward-folded position after unlocking the locking device and while the hinge mechanism is not actuated, the console position being located higher than the retracted position above the base,
wherein the vehicle seat has a first height in the normal position of use, a second height in the retracted position, and a third height in the console position, the first height being greater than the second height and the third height, and the third height being greater than the second height.

19. The vehicle seat of claim 18, further comprising: a motorized adjustment device adapted to control a rotation of the front connecting rod, an electric control device which controls the locking device, the hinge mechanism, and the motorized adjustment device.

20. The vehicle seat of claim 18, wherein the upper pivot of the first rear connecting rod is arranged rearward of the upper pivot of the second rear connecting rod when the backrest support is locked on the base, and forward of the upper pivot of the second rear connecting rod when the backrest is folded in the console position.

* * * * *